(12) United States Patent
Park et al.

(10) Patent No.: US 11,409,675 B2
(45) Date of Patent: Aug. 9, 2022

(54) DATA TRANSMISSION METHOD FOR CONVOLUTION OPERATION, FETCHER, AND CONVOLUTION OPERATION APPARATUS

(71) Applicant: SAMSUNG ELECTRONICS CO., LTD., Suwon-si (KR)

(72) Inventors: Hyunsun Park, Suwon-si (KR); Jun-Woo Jang, Suwon-si (KR); Yoojin Kim, Suwon-si (KR); Channoh Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/330,229

(22) Filed: May 25, 2021

(65) Prior Publication Data
US 2022/0197834 A1    Jun. 23, 2022

(30) Foreign Application Priority Data

Dec. 22, 2020 (KR) .................. 10-2020-0180967

(51) Int. Cl.
    *G06F 13/16*    (2006.01)
    *G06N 3/08*     (2006.01)
(52) U.S. Cl.
    CPC ........... *G06F 13/1668* (2013.01); *G06N 3/08* (2013.01)
(58) Field of Classification Search
    None
    See application file for complete search history.

(56) References Cited

U.S. PATENT DOCUMENTS

| | | |
|---|---|---|
| 10,083,395 B2 | 9/2018 | Young |
| 10,620,876 B1* | 4/2020 | Gauria ............... G06N 3/063 |
| 2018/0129893 A1* | 5/2018 | Son .................. G06N 3/063 |
| 2019/0102671 A1* | 4/2019 | Cohen ............... G06F 16/17 |
| 2019/0180167 A1 | 6/2019 | Huang et al. |
| 2020/0042860 A1 | 2/2020 | Sun et al. |
| 2021/0157767 A1* | 5/2021 | Ross ................. G06F 9/30098 |

FOREIGN PATENT DOCUMENTS

| | | |
|---|---|---|
| CN | 110991631 A | 4/2020 |
| KR | 10-2016-0142791 A | 12/2016 |
| KR | 10-2018-0101978 A | 9/2018 |
| KR | 10-2018-0123846 A | 11/2018 |
| KR | 10-2107077 B1 | 5/2020 |
| KR | 10-2020-0081044 A | 7/2020 |

* cited by examiner

*Primary Examiner* — Michael Sun
(74) *Attorney, Agent, or Firm* — NSIP Law

(57) ABSTRACT

A data transmission method for a convolution operation, and a convolution operation apparatus including a fetcher that includes a loader, at least one sender, a buffer controller, and a reuse buffer. The method includes loading, by the loader, input data of an input feature map according to a loading order, based on input data stored in the reuse buffer, a shape of a kernel to be used for a convolution operation, and two-dimensional (2D) zero-value information of weights of the kernel; storing, by the buffer controller, the loaded input data in the reuse buffer of an address cyclically assigned according to the loading order; and selecting, by each of the at least one sender, input data corresponding to each output data of a convolution operation among the input data stored in the reuse buffer, based on one-dimensional (1D) zero-value information of the weights, and outputting the selected input data.

16 Claims, 7 Drawing Sheets

DATA TRANSMISSION METHOD FOR CONVOLUTION OPERATION, FETCHER, AND CONVOLUTION OPERATION APPARATUS

CROSS-REFERENCE TO RELATED APPLICATIONS

This application claims the benefit under 35 USC § 119(a) of Korean Patent Application No. 10-2020-0180967, filed on Dec. 22, 2020, in the Korean Intellectual Property Office, the entire disclosure of which is incorporated herein by reference for all purposes.

BACKGROUND

1. Field

The following description relates to a buffer management apparatus, and more particularly, to an efficient buffer management apparatus for data reuse of a neural accelerator.

2. Description of Related Art

Deep learning technology is a technique for training a neural network including a plurality of layers, each including a plurality of neurons, based on a large quantity of training data. To increase the accuracy of inference of the neural network, a large quantity of training data is required, and the training data may include images, sound, or text information.

A convolutional neural network (CNN) contributes to significantly improving the accuracy of image classification and recognition through a convolutional operation. However, a CNN-based model requires a large amount of computational operation, and as the quantity of training data increases, required resources also increases.

Various studies are being conducted to accelerate a convolution operation, and hardware acceleration accelerates the convolution operation through hardware improvements. For example, a neural processing unit (NPU) is a processing unit designed to be optimized for parallel processing of matrix operations such as convolution operations, and exhibits a higher operation speed than general processing units.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a data transmission method of a fetcher including a loader, at least one sender, a buffer controller, and a reuse buffer includes loading, by the loader, input data of an input feature map stored in a memory according to a loading order, based on input data stored in the reuse buffer, a shape of a kernel to be used for a convolution operation, and two-dimensional (2D) zero-value information of weights of the kernel, storing, by the buffer controller, the loaded input data in the reuse buffer of an address cyclically assigned according to the loading order, and selecting, by each of the at least one sender, input data corresponding to each output data of a convolution operation among the input data stored in the reuse buffer, based on one-dimensional (1D) zero-value information of the weights, and transmitting the selected input data to an executer.

The kernel may have a rectangular shape. The 2D zero-value information may include 2D position information indicating a position of one or more weights each having a zero value among the weights.

The kernel may have a shape other than a rectangular shape. The 2D zero-value information may include 2D position information indicating a position of one or more weights that do not overlap the kernel in a smallest rectangle that overlaps the kernel.

The kernel may have a rectangular shape. The 2D zero-value information may include 2D position information indicating a position of one or more weights deleted among the weights by pruning.

The loading of the input data may include selecting a position of a weight having a non-zero value among the weights based on the shape of the kernel and the 2D zero-value information, selecting input data that does not overlap the input data stored in the reuse buffer among input data of the input feature map corresponding to the position of the weight having the non-zero value, and loading the selected input data.

The selecting of the input data may include selecting a position of a weight having a non-zero value among the weights based on the 1D zero-value information, selecting input data corresponding to the position of the weight having the non-zero value among the input data stored in the reuse buffer, and transmitting the selected input data to the executer.

A non-transitory computer-readable storage medium may store instructions that, when executed by a processor, cause the processor to perform the data sharing method.

In another general aspect, an apparatus includes a loader, at least one sender, a buffer controller, and a reuse buffer, wherein the loader is configured to load input data of an input feature map stored in a memory according to a loading order, based on input data stored in the reuse buffer, a shape of a kernel to be used for a convolution operation, and 2D zero-value information of weights of the kernel, the buffer controller is configured to store the loaded input data in the reuse buffer of an address cyclically assigned according to the loading order, and each of the at least one sender is configured to select input data corresponding to each output data of a convolution operation among the input data stored in the reuse buffer, based on 1D zero-value information of the weights and transmit the selected input data to an executer.

The kernel may have a rectangular shape. The 2D zero-value information may include 2D position information indicating a position of one or more weights each having a zero value among the weights.

The kernel may have a shape other than a rectangular shape. The 2D zero-value information may include 2D position information indicating a position of one or more weights that do not overlap the kernel in a smallest rectangle that overlaps the kernel.

The kernel may have a rectangular shape. The 2D zero-value information may include 2D position information indicating a position of one or more weights deleted among the weights by pruning.

The loader may be configured to select a position of a weight having a non-zero value among the weights based on the shape of the kernel and the 2D zero-value information, to select input data that does not overlap the input data stored in the reuse buffer among input data of the input feature map corresponding to the position of the weight having the non-zero value, and to load the selected input data.

The at least one sender may be configured to select a position of a weight having a non-zero value among the weights based on the 1D zero-value information, to select input data corresponding to the position of the weight having the non-zero value among the input data stored in the reuse buffer, and to transmit the selected input data to the executer.

The apparatus may include a memory configured to store the input feature map and an executer configured to perform parallel convolution operations on the selected input data output from the at least one sender.

In another general aspect, an apparatus includes one or more processors configured to load input data of an input feature map stored in a memory by loading feature values of the input feature map that correspond to positions of non-zero values of weights of a kernel to be used for a convolution operation and skipping feature values of the input feature map that correspond to positions of zero values of the weights of the kernel, store the input data in a reuse buffer, and select a portion of the input data stored in the reuse buffer to be output based on one-dimensional (1D) zero-value information of the weights of the kernel.

In a case in which the kernel has a non-rectangular shape, the one or more processors may be configured to assign a zero value to any weight that does not overlap the kernel in a smallest rectangle that completely encompasses the kernel.

Other features and aspects will be apparent from the following detailed description, the drawings, and the claims.

Figure 1:
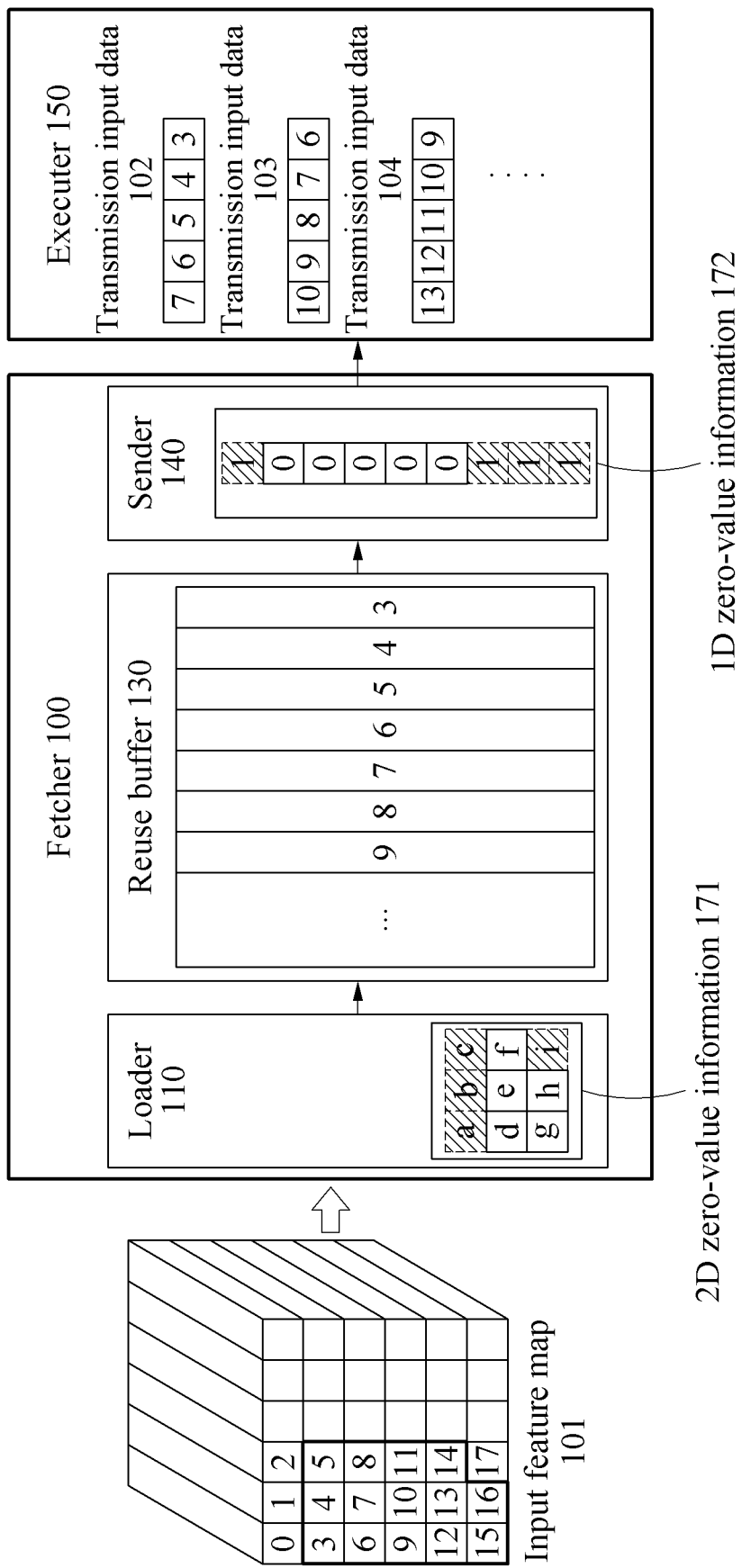
FIG. 1 illustrates an example of a configuration of a convolution operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an example of a configuration of a convolution operation apparatus.

A convolution operation may include a product-sum operation between a kernel and an input feature map (IFM). The kernel may perform the product-sum operation with the input feature map while sliding on the input feature map. An interval at which the kernel slides may be called a "stride". Each pixel of an output feature map that is a result of the convolution operation may be a result of a convolution operation of the kernel with respect to a predetermined region of the input feature map. A convolution operation may occupy a relatively large portion among operations of a neural network for processing an image. The kernel may also be referred to as a "window".

In an example, the convolution operation apparatus may accelerate a convolution operation by reusing input data based on a zero value of a kernel. When a weight of the kernel has a zero value, a loader 110 and a sender 140 of a fetcher 100 for an efficient convolution operation may store zero-value information of the weight and may perform a convolution operation based on the stored zero-value information. The convolution operation apparatus may perform zero skipping in loading of input data and transmitting of input data from the sender 140 to an executer 150.

To this end, the convolution operation apparatus may include a memory (not shown), the fetcher 100, and the executer 150. The fetcher 100 may include the loader 110, at least one sender 140, a buffer controller (not shown), and a reuse buffer 130. The executer 150 may also be referred to as an "executing unit".

The memory may store an input feature map 101. The input feature map 101 may be a multidimensional vector for feature values of an input image. In two dimensions (2D), the input feature map 101 may include feature values of an input image for each pixel.

The convolution operation apparatus may perform a process of fetching input data from the memory, analyzing the fetched input data, and performing an operation on the analyzed data. A function of fetching input data may be performed by the loader 110 of the fetcher 100. The fetcher 100 may also be referred to as a "fetching unit (FU)".

The loader 110 may perform a memory access to load input data stored in the memory. The loader 110 may load input data that is to be actually used for a convolution operation, based on a position of a weight having a zero value among a plurality of weights included in the kernel, and may store the input data in the reuse buffer 130. Since the zero value is not loaded, the loader 110 may reduce a number of memory accesses and save a space in the reuse buffer 130.

Information about a zero value of a weight stored in the loader 110 may be referred to "2D zero-value information". The 2D zero-value information may include 2D position information about a weight having a zero value in the kernel. The 2D position information may be represented by a height and a width.

Referring to FIG. 1, the loader 110 may load input data of the input feature map 101 based on 2D zero-value information 171. The kernel may include weights in which a, b, c, and i are zero values and d, e, f, g, and h are non-zero values. The 2D zero-value information 171 may include a shape of the kernel and information about positions of a, b, c, and i.

The loader 110 may skip a feature value of the input feature map 101 corresponding to a position of a zero value of the kernel based on the 2D zero-value information 171. The kernel may perform a convolution operation with feature values of the input feature map 101 while sliding from top to bottom by a stride.

For example, when the kernel corresponds to 0 to 8, the loader 110 may skip 0, 1, and 2 corresponding to a, b, and c and may load 3 to 7 corresponding to d, e, f, g, and h. The kernel may slide downwards by a stride of "1", and the loader 110 may skip 3, 4, and 5 corresponding to a, b, and c, and may load 8 to 10 by skipping 6 and 7 that are already loaded among 6 to 11 corresponding to d, e, f, g, and h. The loader 110 may skip 11 corresponding to i. When loading is repeated as described above, the loader 110 may skip 0, 1, and 2 corresponding to a, b, and c, and 17 corresponding to i. The loader 110 may load 3 to 16 corresponding to d, e, f, g, and h once. Loaded input data may be stored in the reuse buffer 130.

The fetcher 100 may reduce a number of memory accesses by reusing data. The fetcher 100 may share memory bandwidth resources with one or more executers 150, thereby alleviating a memory bottleneck phenomenon. The reuse buffer 130 may be a space in which input data read from the loader 110 is stored. The input data may include the input feature map 101.

The buffer controller may calculate an address in which input data is to be stored, may write the input data on the calculated address, and may flush an assigned address. For example, the buffer controller may calculate an address of the reuse buffer 130 to be assigned, based on a load counter, a loading unit, a size of the reuse buffer 130, and a quantity of data to be shared. The buffer controller may calculate an address in which flushing is to be performed based on a send counter of each sender 140.

The sender 140 may transmit input data stored in the reuse buffer 130 to the executer 150. The sender 140 may fetch input data corresponding to each output data of a convolution operation from the reuse buffer 130 and may transmit the input data to the executer 150. The sender 140 may select input data required by the reuse buffer 130 based on a position of a weight having a zero value among a plurality of weights included in a kernel, and may transmit the selected input data to the executer 150. By selecting input data used for a convolution operation, a transmission efficiency and an operation speed of the executer 150 may increase.

Information about a zero value of a weight stored in the sender 140 may be referred to as "one-dimensional (1D) zero-value information". The 1D zero-value information may include relative position information of zero values of a kernel with respect to input data in a 1D address system of the reuse buffer 130.

The sender 140 may transmit input data required for output data while increasing the send counter one by one. The transmitted input data may be referred to as "transmission input data 102, transmission input data 103, and transmission input data 104". An address of a buffer to be read by the sender 140 may be calculated in advance. An address of the reuse buffer 130 in which the transmission input data 102, 103, and 104 are stored may be calculated based on the send counter. The transmission input data 102, 103, and 104 may overlap each other.

For example, when at least one sender is used, each of the at least one sender may correspond to each of the transmission input data 102, 103, and 104 for outputting respective output data. In this example, the at least one sender may share data stored in the reuse buffer 130.

For example, in 1D zero-value information 172, a position indicated by "1" may be a position of a weight having a zero value, and a position indicated by "0" may be a position of a weight having a non-zero value. The 1D zero-value information 172 may correspond to the 2D zero-value information 171. First three "1"s of the 1D zero-value information 172 from bottom to top may correspond to a, b, and c of the 2D zero-value information 171, and a last "1" of the 1D zero-value information 172 may correspond to i of the 2D zero-value information 171.

The sender 140 may skip a position indicated by "1" and may transmit input data stored in the reuse buffer 130 corresponding to a position indicated by "0" to the executer 150. The sender 140 may transmit each of the transmission input data 102, 103, and 104 corresponding to positions indicated by "0" to the executer 150 in response to each convolution operation.

The executer 150 may perform convolution operations in parallel. For example, when "N" senders are included in the fetcher 100, the executer 150 may perform convolution operations on input data input from the "N" senders in parallel. Output data may be stored in a storage (not shown). The storage may be referred to as a "storing unit".

In an example, the convolution operation apparatus may be applied to a kernel having a rectangular shape with a weight having a zero value. The kernel may have a rectangular shape, and a portion of weights included in the kernel may have a zero value. In another example, the kernel may have a shape other than a rectangular shape. In this example, a zero value may be assumed as a value of a weight at a position that does not overlap the kernel in a smallest rectangle that overlaps the kernel. In another example, the kernel may include a kernel from which a portion of weights is deleted through pruning. In this example, a zero value may be assumed as a value of a weight at a position that does not overlap the kernel in a smallest rectangle that overlaps the kernel.

Thus, the convolution operation apparatus may not unnecessarily load or transmit input data. The convolution operation apparatus may accelerate computation and reduce power consumption, by reducing a number of times loading and transmitting are performed. Therefore, the convolution operation apparatus may save a space in a reuse buffer.

Figure 2:
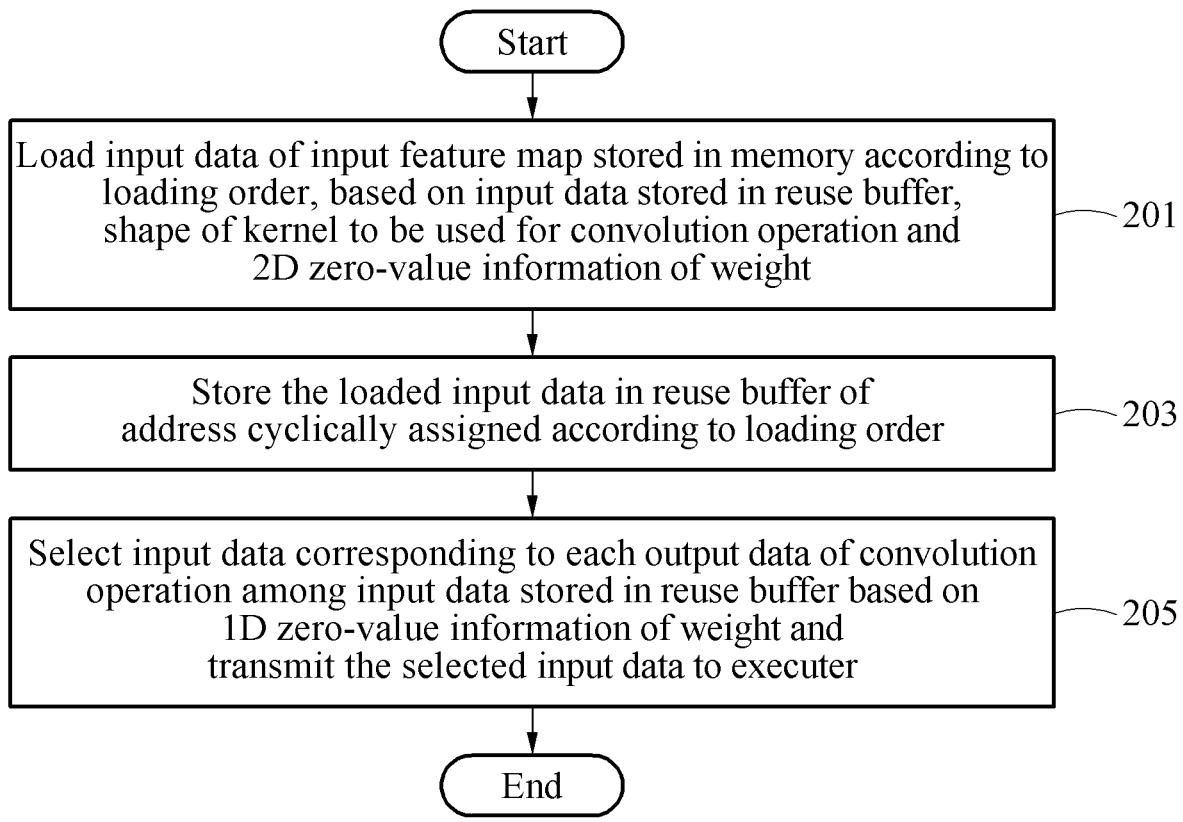
FIG. 2 illustrates an example of operations of a data transmission method for a convolution operation.

FIG. 2 illustrates an example of operations of a data transmission method for a convolution operation.

In an example, a fetcher (for example, the fetcher 100 of FIG. 1) may include a loader (the loader 110 of FIG. 1), at least one sender (for example, the sender 140 of FIG. 1), a buffer controller (not shown), and a reuse buffer (the reuse buffer 130 of FIG. 1).

In operation 201, the loader may load input data of an input feature map stored in a memory according to a loading order, based on input data stored in the reuse buffer, a shape of a kernel to be used for a convolution operation, and 2D zero-value information of weights of the kernel.

The loader may select a position of a weight having a non-zero value among the weights based on the shape of the kernel and the 2D zero-value information. The loader may select input data that does not overlap the input data stored in the reuse buffer among input data of the input feature map corresponding to the position of the weight having the non-zero value. The loader may load the selected input data.

In an example, the kernel may have a rectangular shape, and the 2D zero-value information may include 2D position information indicating a position of a weight having a zero value among the weights. In another example, the kernel may have a shape other than a rectangular shape, and the 2D zero-value information may include 2D position information indicating a position of a weight that does not overlap the kernel in a smallest rectangle that overlaps the kernel. In another example, the kernel may have a rectangular shape, and the 2D zero-value information may include 2D position information indicating a position of a weight deleted among the weights by pruning.

In operation 203, the buffer controller may store the loaded input data in the reuse buffer of an address cyclically assigned according to the loading order.

In operation 205, each of the at least one sender may select input data corresponding to each output data of a convolution operation among the input data stored in the reuse buffer, based on 1D zero-value information of the weights, and may transmit the selected input data to an executer.

The sender may select a position of a weight having a non-zero value among the weights based on the 1D zero-value information. The sender may select input data corresponding to the position of the weight having the non-zero value among the input data stored in the reuse buffer. The sender may transmit the selected input data to the executer.

Figure 3:
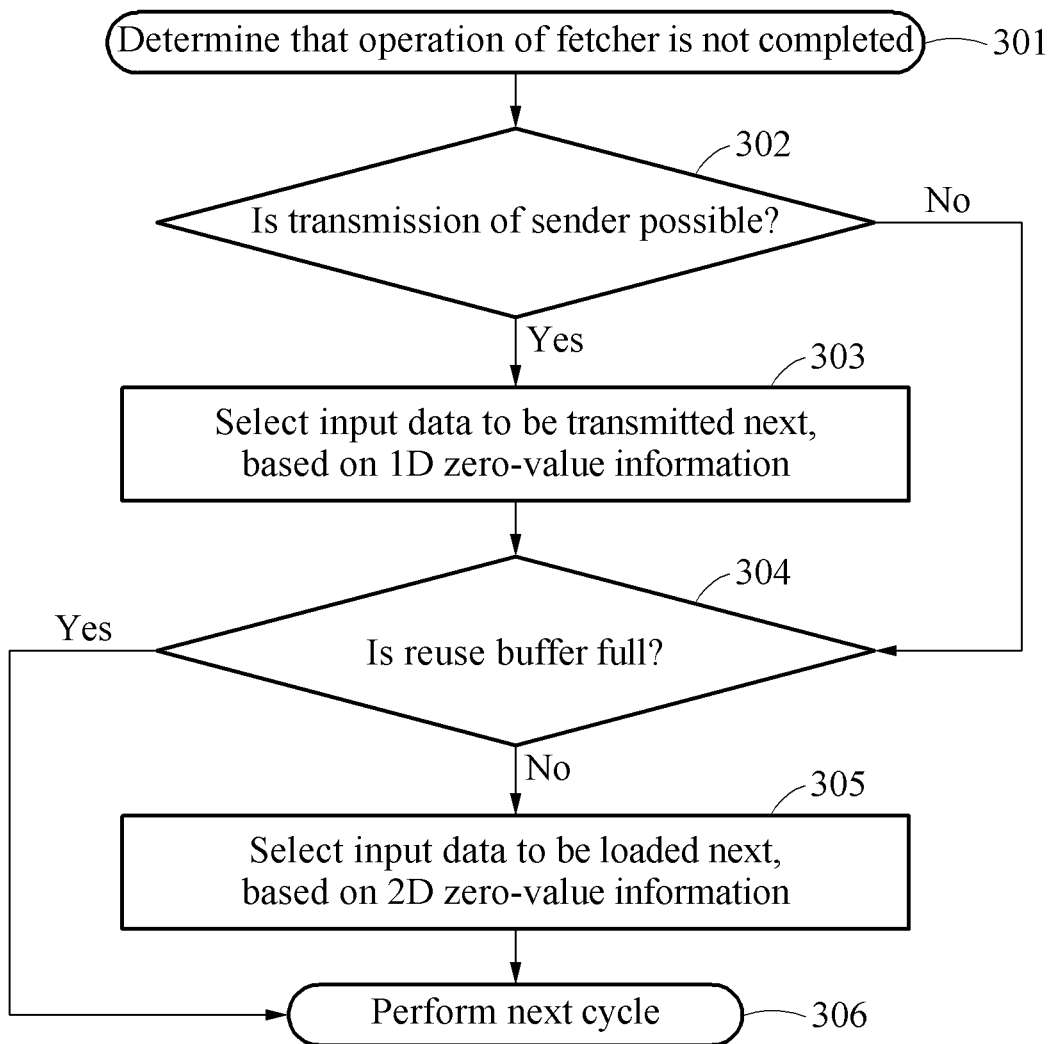
FIG. 3 illustrates an example of a data transmission method for a convolution operation.

FIG. 3 illustrates an example of a data transmission method for a convolution operation.

FIG. 3 illustrates an example in which a fetcher (for example, the fetcher 100 of FIG. 1) performs operations for each cycle for a data transmission for a convolution operation.

In operation 301, it is determined whether an operation of the fetcher is completed. When it is determined that the operation of the fetcher is not completed in operation 301, operation 302 may be performed.

In operation 302, whether a transmission of a sender (for example, the sender 140 of FIG. 1) is possible may be determined. The sender may check a state of an executer (for example, the executer 150 of FIG. 1), and may determine whether the transmission of the sender is possible, based on a result of the checking.

In operation 303, the sender may select input data that is to be transmitted next, based on 1D zero-value information. The sender may select input data corresponding to a position of a weight having a non-zero value among input data stored in a reuse buffer (for example, the reuse buffer 130 of FIG. 1), based on the 1D zero-value information. The sender may transmit the selected input data to an executer.

In operation 304, whether the reuse buffer is full may be determined. For example, when the reuse buffer has a space for storage, operation 305 may be performed.

In operation 305, the loader (for example, the loader 110 of FIG. 1) may select input data that is to be loaded next, based on 2D zero-value information. The loader may select input data based on a shape of a kernel and position information of a weight having a zero value. The loader may select input data that does not overlap the input data stored in the reuse buffer. The loader may store the selected input data in the reuse buffer.

In operation 306, a next cycle may be performed.

Figure 4:
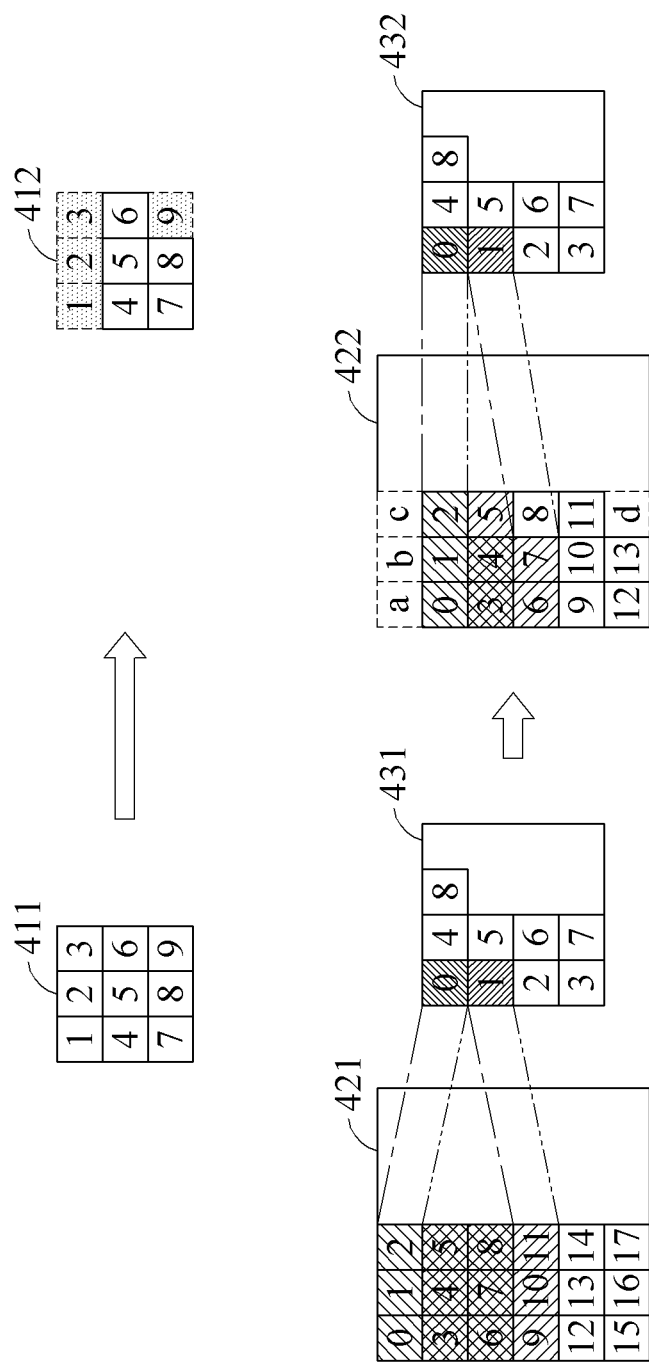
FIG. 4 illustrates an example of input data loaded by a convolution operation apparatus.

FIG. 4 illustrates an example of input data loaded by a convolution operation apparatus.

A kernel 411, an input feature map 421, and an output feature map 431 correspond to a general case in which zero skipping is not considered. A kernel 412, an input feature map 422, and an output feature map 432 correspond to an example in which a convolution operation apparatus performs zero skipping.

All weights of 1 to 9 in the kernel 411 may have non-zero values. Each of output values of the output feature map 431 may be output through a convolution operation of the kernel 411 and the input feature map 421. For example, an output value of 0 may be output through a convolution operation between the kernel 411 and input values of 0 to 8 corresponding to the kernel 411. An output value of 1 may be output through a convolution operation between the kernel 411 and input values of 3 to 11 corresponding to the kernel 411 when the kernel 411 slides downwards by one stride.

In the kernel 412, weights of 1 to 3 and 9 may have zero values, and weights of 4 to 8 may have non-zero values. Each of output values of the output feature map 432 may be output through a convolution operation of the kernel 412 and the input feature map 422. For example, an output value of 0 may be output through a convolution operation between the kernel 412 and input values of 0 to 4 corresponding to positions of weights having non-zero values of the kernel 412. An output value of 1 may be output through a convolution operation between the kernel 412 and input values of 3 to 7 corresponding to a position of a weight having a non-zero value of the kernel 412 when the kernel 412 slides downwards by one stride.

As described above, the convolution operation apparatus may not unnecessarily load or transmit input data. The convolution operation apparatus may accelerate computation and reduce power consumption, by reducing a number of times loading and transmitting are performed. The convolution operation apparatus may save space in a reuse buffer.

Figure 5:
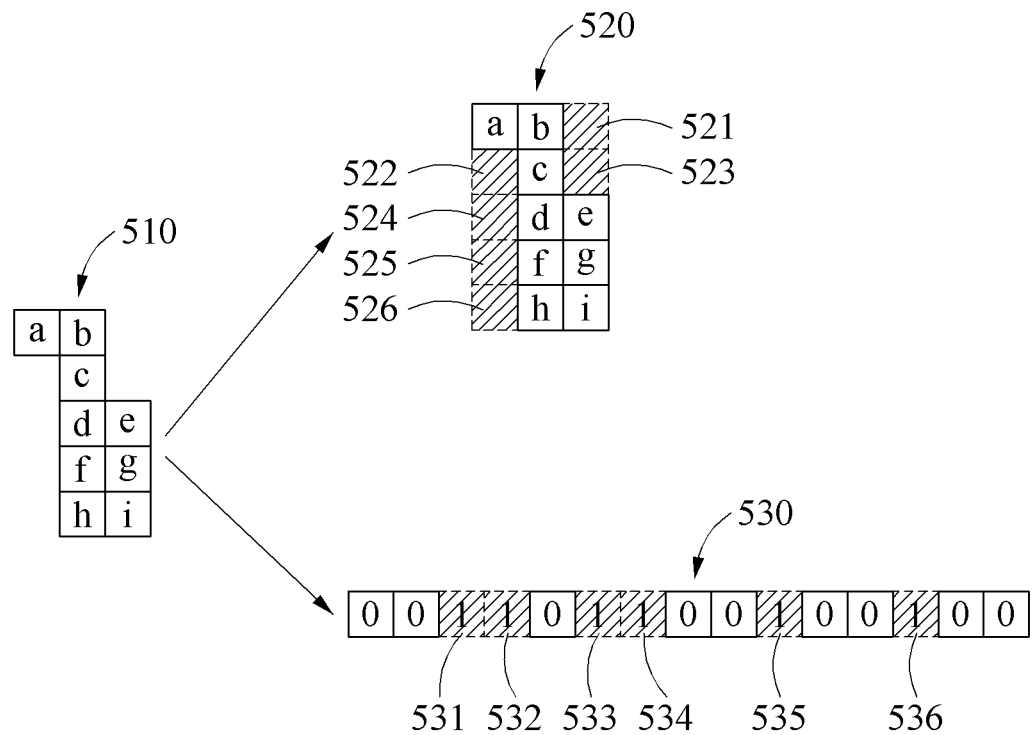
FIG. 5 illustrates an example of one-dimensional (1D) zero-value information and two-dimensional (2D) zero-value information used by a convolution operation apparatus.

FIG. 5 illustrates an example of 2D zero-value information and 1D zero-value information used by a convolution operation apparatus.

Referring to FIG. 5, a kernel 510 may include weights having zero values. In the kernel 510, weights of a, b, c, d, e, f, g, h, and i may have non-zero values, and the other weights may have zero values. In an example, the kernel 510 may have a rectangular shape, and a portion of weights included in the kernel 510 may have a zero value. In another example, the kernel 510 may have a shape other than the rectangular shape. In this example, a zero value may be assumed as a value of a weight at a position that does not overlap the kernel 510 in a smallest rectangle that overlaps the kernel 510. In another example, the kernel 510 may include a kernel from which a portion of weights is deleted through pruning. In this example, a zero value may be assumed as a value of a weight at a position that does not overlap the kernel 510 in a smallest rectangle that overlaps the kernel 510.

2D zero-value information 520 (for example, the 2D zero-value information 171 of FIG. 1) may represent a position of a weight included in the kernel 510 in 2D. The 2D zero-value information 520 may include a width and a height and indicate positions of weights 521, 522, 523, 524, 525, and 526 having zero values. A loader (for example, the loader 110 of FIG. 1) may store the 2D zero-value information 520 and may selectively load input data of an input feature map based on the 2D zero-value information 520.

1 D zero-value information 530 (for example, the 1D zero-value information 172 of FIG. 1) may represent a position of a weight included in the kernel 510 in 1D. A sender (for example, the sender 140 of FIG. 1) may need to select input data stored in a storage space of a 1 D address system of a reuse buffer (for example, the reuse buffer 130 of FIG. 1), and accordingly the 1D zero-value information 530 expressed as a 1D position may be more advantageous than the 2D zero-value information 520.

The 1D zero-value information 530 may indicate positions of weights 531, 532, 533, 534, 535, and 536 having zero values. In FIG. 5, "1" may indicate that a weight has a zero value, and "0" may indicate that a weight has a non-zero value. The weights 531, 532, 533, 534, 535, and 536 having the zero values may respectively correspond to the weights 521, 522, 523, 524, 525, and 526 having the zero values. The sender may store the 1D zero-value information 530, and may select input data that is to be transmitted to an executer (for example, the executer 150 of FIG. 1) based on the 1D zero-value information 530.

Figure 6:
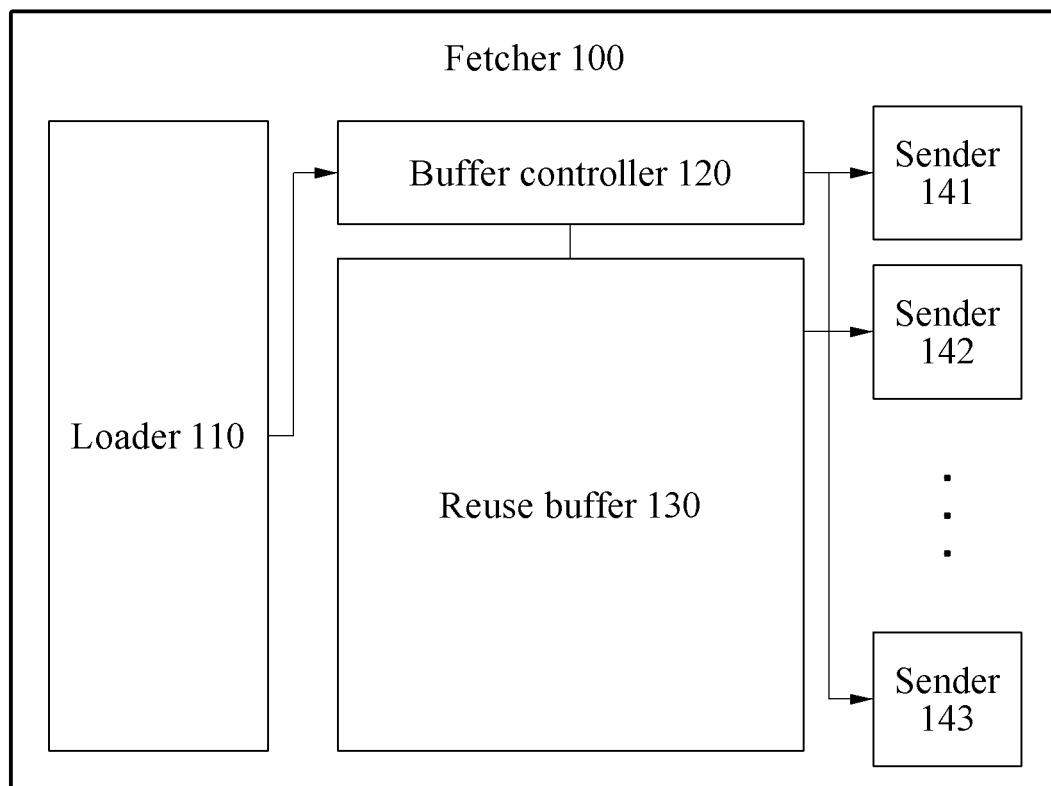
FIG. 6 illustrates an example of a configuration of a fetcher.

FIG. 6 illustrates an example of a configuration of a fetcher.

Referring to FIG. 6, a fetcher 100 may include a loader 110, a buffer controller 120, a reuse buffer 130, and at least one sender, for example, senders 141, 142, and 143.

The loader 110 may load input data of an input feature map stored in a memory according to a loading order, based on input data stored in the reuse buffer 130, a shape of a kernel to be used for a convolution operation, and 2D zero-value information of weights of the kernel.

The loader 110 may select a position of a weight having a non-zero value among weights, based on the shape of the kernel and the 2D zero-value information. The loader 110 may select input data that does not overlap the input data stored in the reuse buffer 130 among input data of the input feature map corresponding to the position of the weight having the non-zero value. The loader 110 may load the selected input data.

The buffer controller 120 may store the loaded input data in the reuse buffer 130 of an address cyclically assigned according to the loading order.

Each of the senders 141, 142, and 143 may select input data corresponding to each output data of a convolution operation among the input data stored in the reuse buffer 130, based on 1D zero-value information of the weights, and may transmit the selected input data to an executer.

Each of the senders 141, 142, and 143 may select a position of a weight having a non-zero value among the weights based on the 1D zero-value information. Each of the senders 141, 142, and 143 may select input data corresponding to the position of the weight having the non-zero value among the input data stored in the reuse buffer 130. Each of the senders 141, 142, and 143 may transmit the selected input data to the executer.

In an example, the kernel may have a rectangular shape, and the 2D zero-value information may include 2D position information indicating a position of a weight having a zero value among the weights. In another example, the kernel may have a shape other than a rectangular shape, and the 2D zero-value information may include 2D position information indicating a position of a weight that does not overlap the kernel in a smallest rectangle that overlaps the kernel. In another example, the kernel may have a rectangular shape, and the 2D zero-value information may include 2D position information indicating a position of a weight deleted among the weights by pruning.

Figure 7:
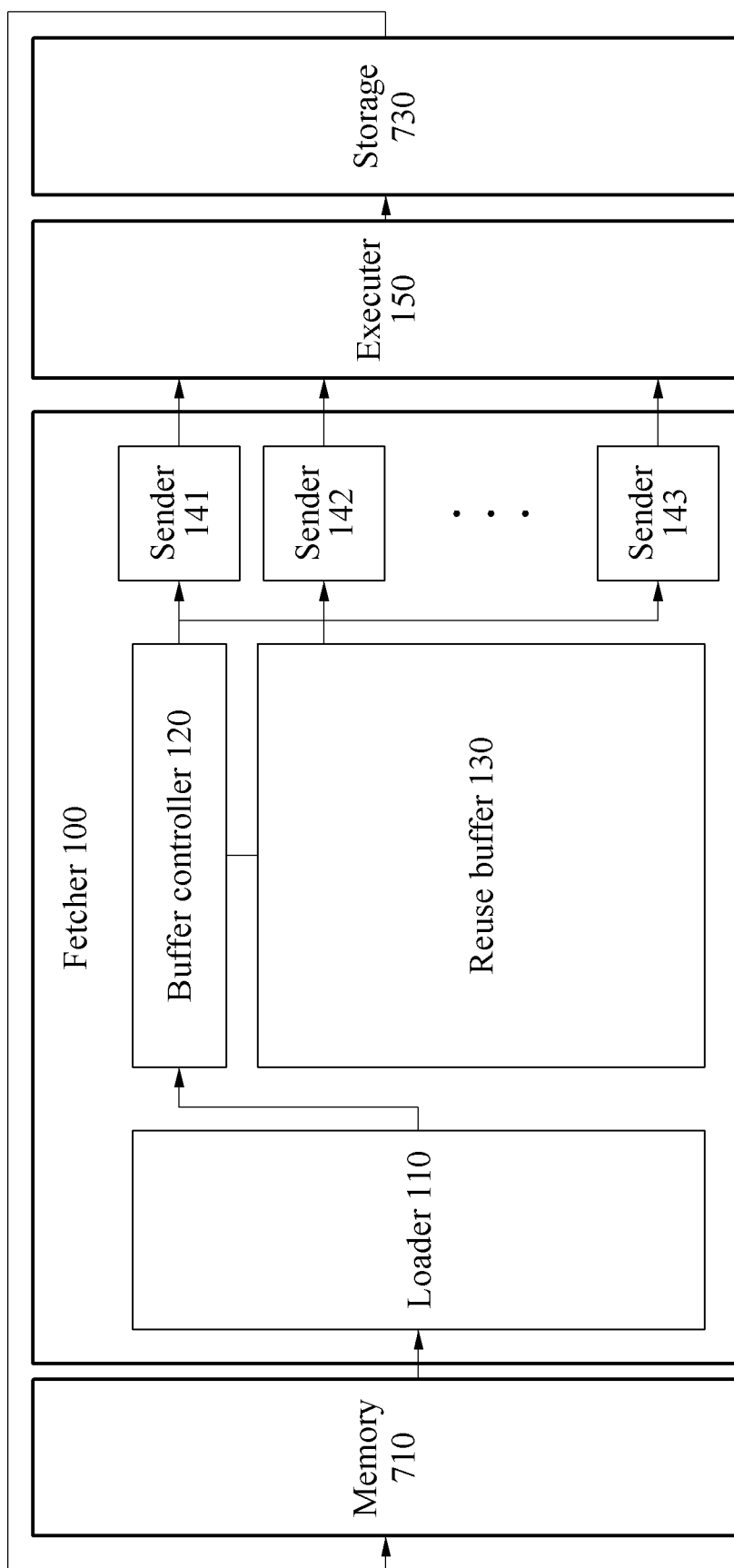
FIG. 7 illustrates another example of a configuration of a convolution operation apparatus.

FIG. 7 illustrates an example of a configuration of a convolution operation apparatus.

Referring to FIG. 7, the convolution operation apparatus may include a memory 710, a fetcher 100, an executer 150, and a storage 730. The fetcher 100 may include a loader 110, a buffer controller 120, a reuse buffer 130, and at least one sender, for example, senders 141, 142, and 143.

The loader 110 may load input data of an input feature map stored in the memory 710 according to a loading order, based on input data stored in the reuse buffer 130, a shape of a kernel to be used for a convolution operation, and 2D zero-value information of weights of the kernel.

The buffer controller 120 may store the loaded input data in the reuse buffer 130 of an address cyclically assigned according to the loading order.

Each of the senders 141, 142, and 143 may select input data corresponding to each output data of a convolution operation among the input data stored in the reuse buffer 130, based on 1D zero-value information of the weights, and may transmit the selected input data to the executer 150.

The apparatuses, units, modules, devices, and other components described herein with respect to FIGS. 1, 6, and 7, such as fetcher 100, loader 110, buffer controller 120, reuse buffer 130, sender 140, sender 141, sender 142, sender 143, executer 150, memory 710, and storage 730, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing software, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data transmission method of a fetcher comprising a loader, at least one sender, a buffer controller, and a reuse buffer, the data transmission method comprising:
loading, by the loader, input data of an input feature map stored in a memory according to a loading order, based on input data stored in the reuse buffer, a shape of a kernel to be used for a convolution operation, and two-dimensional (2D) zero-value information of weights of the kernel;
storing, by the buffer controller, the loaded input data in the reuse buffer of an address cyclically assigned according to the loading order; and
selecting, by each of the at least one sender, input data corresponding to each output data of a convolution operation among the input data stored in the reuse buffer, based on one-dimensional (1D) zero-value information of the weights, and outputting the selected input data.

2. The data transmission method of claim 1, wherein the kernel has a rectangular shape, and
the 2D zero-value information comprises 2D position information indicating a position of one or more weights each having a zero value among the weights.

3. The data transmission method of claim 1, wherein the kernel has a shape other than a rectangular shape, and
the 2D zero-value information comprises 2D position information indicating a position of one or more weights that do not overlap the kernel in a smallest rectangle that overlaps the kernel.

4. The data transmission method of claim 1, wherein the kernel has a rectangular shape, and
the 2D zero-value information comprises 2D position information indicating a position of one or more weights deleted among the weights by pruning.

5. The data transmission method of claim 1, wherein the loading of the input data comprises:
selecting a position of a weight having a non-zero value among the weights based on the shape of the kernel and the 2D zero-value information;
selecting input data that does not overlap the input data stored in the reuse buffer among input data of the input feature map corresponding to the position of the weight having the non-zero value; and
loading the selected input data.

6. The data transmission method of claim 1, wherein the selecting of the input data comprises:
selecting a position of a weight having a non-zero value among the weights based on the 1D zero-value information;
selecting input data corresponding to the position of the weight having the non-zero value among the input data stored in the reuse buffer; and
transmitting the selected input data to an executer.

7. A non-transitory computer-readable storage medium storing instructions that, when executed by a processor, cause the processor to perform the data transmission method of claim 1.

8. An apparatus comprising:
a loader;
at least one sender;
a buffer controller; and
a reuse buffer,
wherein the loader is configured to load input data of an input feature map stored in a memory according to a loading order, based on input data stored in the reuse buffer, a shape of a kernel to be used for a convolution operation, and two-dimensional (2D) zero-value information of weights of the kernel,
the buffer controller is configured to store the loaded input data in the reuse buffer of an address cyclically assigned according to the loading order, and
each of the at least one sender is configured to select input data corresponding to each output data of a convolution operation among the input data stored in the reuse buffer, based on one-dimensional (1D) zero-value information of the weights, and output the selected input data.

9. The apparatus of claim 8, wherein
the kernel has a rectangular shape, and
the 2D zero-value information comprises 2D position information indicating a position of one or more weights each having a zero value among the weights.

10. The apparatus of claim 8, wherein the loading comprises:
the kernel has a shape other than a rectangular shape, and
the 2D zero-value information comprises 2D position information indicating a position of one or more weights that do not overlap the kernel in a smallest rectangle that overlaps the kernel.

11. The apparatus of claim 8, wherein
the kernel has a rectangular shape, and
the 2D zero-value information comprises 2D position information indicating a position of one or more weights deleted among the weights by pruning.

12. The apparatus of claim 8, wherein the loader is configured to:
select a position of a weight having a non-zero value among the weights based on the shape of the kernel and the 2D zero-value information;
select input data that does not overlap the input data stored in the reuse buffer among input data of the input feature map corresponding to the position of the weight having the non-zero value; and
load the selected input data.

13. The apparatus of claim 8, wherein the at least one sender is configured to:
select a position of a weight having a non-zero value among the weights based on the 1D zero-value information;
select input data corresponding to the position of the weight having the non-zero value among the input data stored in the reuse buffer; and
transmit the selected input data to an executer.

14. The apparatus of claim 8, further comprising:
a memory configured to store the input feature map; and
an executer configured to perform parallel convolution operations on the selected input data output from the at least one sender.

15. An apparatus comprising:
one or more processors configured to:
- load input data of an input feature map stored in a memory by loading feature values of the input feature map that correspond to positions of non-zero values of weights of a kernel to be used for a convolution operation and skipping feature values of the input feature map that correspond to positions of zero values of the weights of the kernel,
- store the input data in a reuse buffer, and
- select a portion of the input data stored in the reuse buffer to be output based on one-dimensional (1D) zero-value information of the weights of the kernel.

16. The apparatus of claim 15, wherein, in a case in which the kernel has a non-rectangular shape, the one or more processors are configured to assign a zero value to any weight that does not overlap the kernel in a smallest rectangle that completely encompasses the kernel.

* * * * *